(12) United States Patent
Holmes

(10) Patent No.: US 9,177,433 B2
(45) Date of Patent: Nov. 3, 2015

(54) MOIRE MAGNIFICATION DEVICE

(75) Inventor: Brian William Holmes, Fleet (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 364 days.

(21) Appl. No.: 13/580,730

(22) PCT Filed: Mar. 1, 2011

(86) PCT No.: PCT/GB2011/050407
§ 371 (c)(1), (2), (4) Date: Oct. 24, 2012

(87) PCT Pub. No.: WO2011/107791
PCT Pub. Date: Sep. 9, 2011

(65) Prior Publication Data
US 2013/0050818 A1 Feb. 28, 2013

(30) Foreign Application Priority Data
Mar. 1, 2010 (GB) .................... 1003397.5

(51) Int. Cl.
| | |
|---|---|
| *G02B 27/22* | (2006.01) |
| *G02B 27/10* | (2006.01) |
| *G07D 7/00* | (2006.01) |
| *G07D 7/20* | (2006.01) |
| *B42D 25/342* | (2014.01) |
| *B42D 25/324* | (2014.01) |

(Continued)

(52) U.S. Cl.
CPC ............ *G07D 7/0006* (2013.01); *B42D 25/324* (2013.01); *B42D 25/342* (2014.10); *B42D 25/351* (2013.01); *G07D 7/2066* (2013.01); *B42D 2035/20* (2013.01); *B42D 2035/44* (2013.01); *G02B 3/0056* (2013.01)

(58) Field of Classification Search
None
See application file for complete search history.

(56) References Cited

U.S. PATENT DOCUMENTS

| | | | |
|---|---|---|---|
| 4,652,015 | A | 3/1987 | Crane |
| 5,694,229 | A | 12/1997 | Drinkwater et al. |
| 6,450,540 | B1 | 9/2002 | Kim |

(Continued)

FOREIGN PATENT DOCUMENTS

| | | | |
|---|---|---|---|
| AU | 734 937 | B2 | 6/2001 |
| CA | 2 581 142 | A1 | 3/2006 |

(Continued)

OTHER PUBLICATIONS

Oct. 29, 2013 Office Action issued in Japanese Patent Application No. 2012-555490 (with translation).

(Continued)

*Primary Examiner* — Jade R Chwasz
(74) *Attorney, Agent, or Firm* — Oliff PLC

(57) ABSTRACT

A moiré magnification device includes a transparent substrate, the transparent substrate carrying a regular array of micro-focusing elements on a first surface, where the focusing elements define a focal plane, and a corresponding array of microimage element unit cells located in a plane substantially coincident with the focal plane of the focusing elements, where each unit cell includes at least two microimage components. The pitches of the micro-focusing elements and the array of microimage element unit cells and their relative locations are such that the array of micro-focusing elements cooperates with the array of microimage element unit cells to generate magnified versions of the microimage components due to the moiré effect.

28 Claims, 18 Drawing Sheets

(51) Int. Cl.
*B42D 25/351* (2014.01)
*G02B 3/00* (2006.01)

(56) References Cited

U.S. PATENT DOCUMENTS

| | | |
|---|---|---|
| 6,508,489 B2 | 1/2003 | Herrmann et al. |
| 2004/0084893 A1 | 5/2004 | Fan et al. |
| 2007/0075150 A1 | 4/2007 | Luthi et al. |
| 2008/0036196 A1 | 2/2008 | Steenblik et al. |
| 2008/0067801 A1 | 3/2008 | Schilling et al. |
| 2008/0160226 A1 | 7/2008 | Kaule et al. |
| 2008/0182084 A1 | 7/2008 | Tompkin et al. |
| 2008/0191463 A1 | 8/2008 | Vermeulen et al. |
| 2008/0284157 A1 | 11/2008 | Muke et al. |
| 2009/0034082 A1* | 2/2009 | Commander et al. ........ 359/619 |
| 2009/0102605 A1 | 4/2009 | Kaule |
| 2009/0297805 A1 | 12/2009 | Dichtl |
| 2009/0322071 A1 | 12/2009 | Dichtl |
| 2010/0177094 A1 | 7/2010 | Kaule et al. |
| 2011/0109078 A1 | 5/2011 | Hoffmuller et al. |
| 2012/0193905 A1 | 8/2012 | Schilling et al. |
| 2012/0243744 A1 | 9/2012 | Camus et al. |
| 2012/0274998 A1 | 11/2012 | Holmes et al. |

FOREIGN PATENT DOCUMENTS

| | | |
|---|---|---|
| DE | 10 2004 056 553 A1 | 5/2006 |
| DE | 10 2007 029 204 A1 | 1/2009 |
| DE | 10 2008 029 638 A1 | 12/2009 |
| EP | 0 059 056 A1 | 9/1982 |
| EP | 0 279 526 A2 | 8/1988 |
| EP | 0 723 501 B1 | 7/1996 |
| EP | 0 724 519 B1 | 8/1996 |
| EP | 0 860 298 A2 | 8/1998 |
| EP | 1 398 174 A1 | 3/2004 |
| EP | 1 897 700 A2 | 3/2008 |
| EP | 1953002 A2 | 8/2008 |
| GB | 1 407 065 | 9/1975 |
| JP | A-2001-26175 | 1/2001 |
| JP | 2003-039583 A | 2/2003 |
| JP | A-2004-317636 | 11/2004 |
| JP | 2005-007593 A | 1/2005 |
| JP | 2008-012870 A | 1/2008 |
| JP | A-2008-513816 | 5/2008 |
| JP | 2008-529851 A | 8/2008 |
| JP | A-2009-086210 | 4/2009 |
| JP | A-2009-536885 | 10/2009 |
| JP | 2009-262375 A | 11/2009 |
| JP | A-2009-541873 | 11/2009 |
| JP | A-2009-543138 | 12/2009 |
| JP | 2013-504451 A | 2/2013 |
| WO | WO 83/00659 A1 | 3/1983 |
| WO | WO 94/27254 A1 | 11/1994 |
| WO | WO 00/39391 A1 | 7/2000 |
| WO | WO 01/23943 A1 | 4/2001 |
| WO | WO 03/054297 A2 | 7/2003 |
| WO | WO 03/091952 A2 | 11/2003 |
| WO | WO 03/091953 A2 | 11/2003 |
| WO | WO 03/095188 A2 | 11/2003 |
| WO | WO 2005/052650 A2 | 6/2005 |
| WO | WO 2005/106601 A2 | 11/2005 |
| WO | 2006/087138 A1 | 8/2006 |
| WO | WO 2006/125224 A2 | 11/2006 |
| WO | WO 2007/133613 A2 | 11/2007 |
| WO | 2008/000351 A2 | 1/2008 |
| WO | WO 2008/000351 A2 | 1/2008 |
| WO | WO 2008/008635 A2 | 1/2008 |
| WO | WO 2009/121578 A2 | 10/2009 |
| WO | WO 2009/139396 A1 | 11/2009 |
| WO | WO 2009/156079 | 12/2009 |
| WO | 2010/057832 A1 | 5/2010 |
| WO | 2011/029602 A2 | 3/2011 |
| WO | 2011051904 A1 | 5/2011 |

OTHER PUBLICATIONS

Oct. 29, 2013 Office Action issued in Japanese Patent Application No. 2012-555491 (with translation).
Hutley et al., "The Moiré Magnifier", Pure Appl. Opt. 3 (1994) pp. 133-142 published by IOP Publishing Limited.
Jun. 27, 2011 International Search Report issued in International Application No. PCT/GB2011/050407.
Jun. 7, 2011 International Search Report issued in International Application No. PCT/GB2011/050399.
Jun. 10, 2011 International Search Report issued in International Application No. PCT/GB2011/050398.
Jun. 30, 2011 International Search Report issued in International Application No. PCT/GB2011/050404.
U.S. Appl. No. 13/580,837, filed in the name of Holmes, on Oct. 24, 2012.
U.S. Appl. No. 13/580,784, filed in the name of Holmes, on Oct. 19, 2012.
U.S. Appl. No. 13/580,797, filed in the name of Holmes, on Oct. 24, 2012.
Office Action dated Sep. 29, 2014 issued in U.S. Appl. No. 13/580,784.
Jun. 10, 2014 Office Action issued in U.S. Appl. No. 13/580,837.
Nov. 5, 2014 Office Action issued in U.S. Appl. No. 13/580,797.
Jan. 6, 2015 Office Action issued in Japanese Patent Application No. 2012-555489.
Jan. 6, 2015 Office Action issued in Japanese Patent Application No. 2012-555488.
Jun. 8, 2015 Office Action issued in U.S. Appl. No. 13/580,784.

* cited by examiner

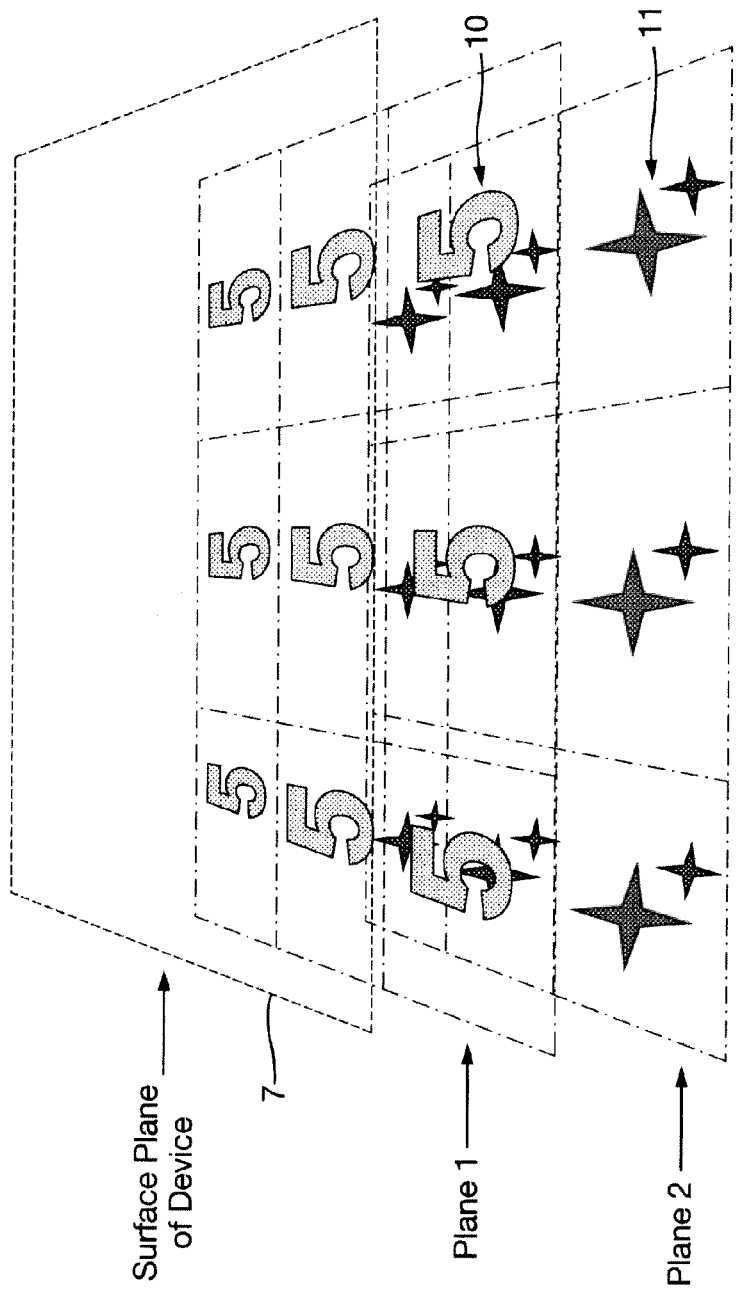

Micro-image Unit
Cell For Plane 1

Micro-image Unit
Cell For Plane 2

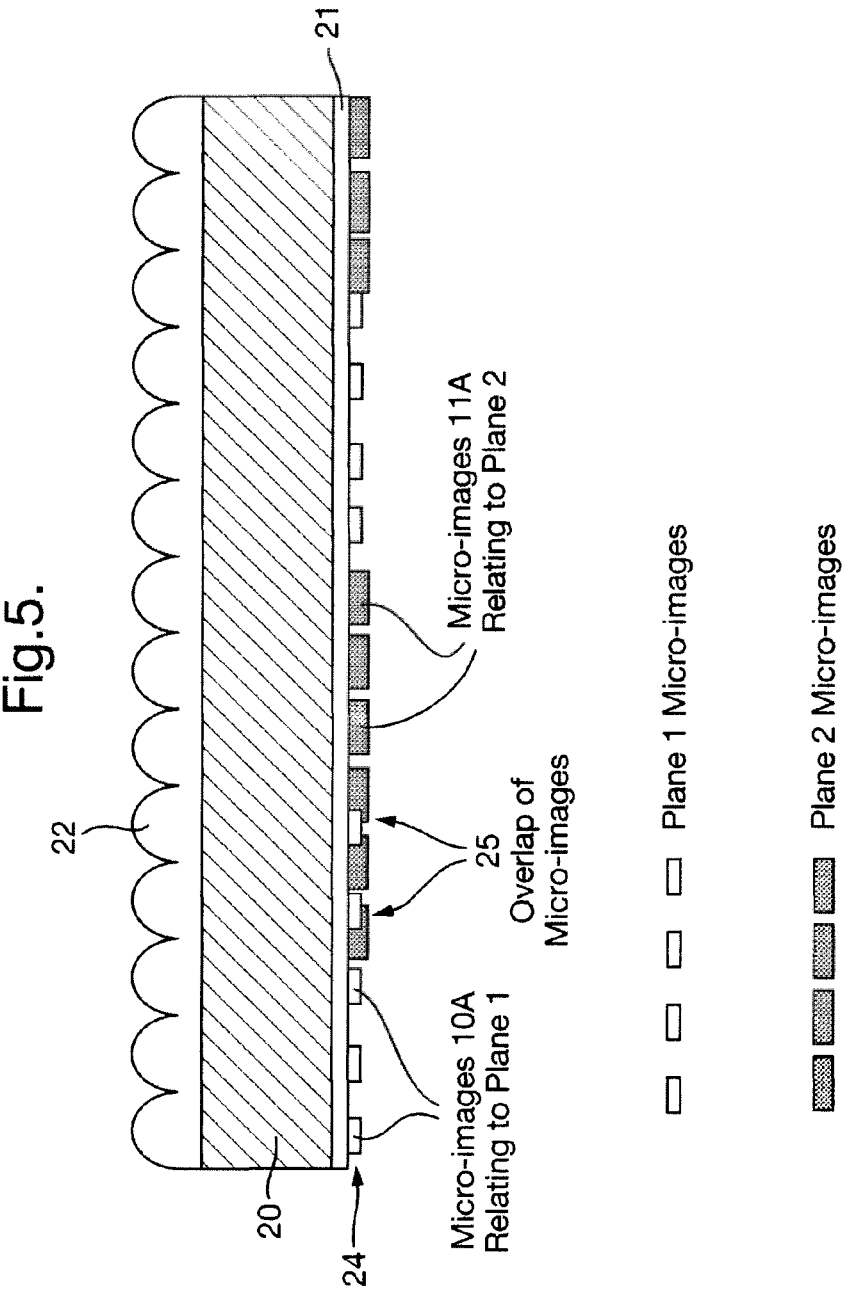

100

100'

Composite Micro-image
Element "8"

Multicoloured array when using
a yellow background

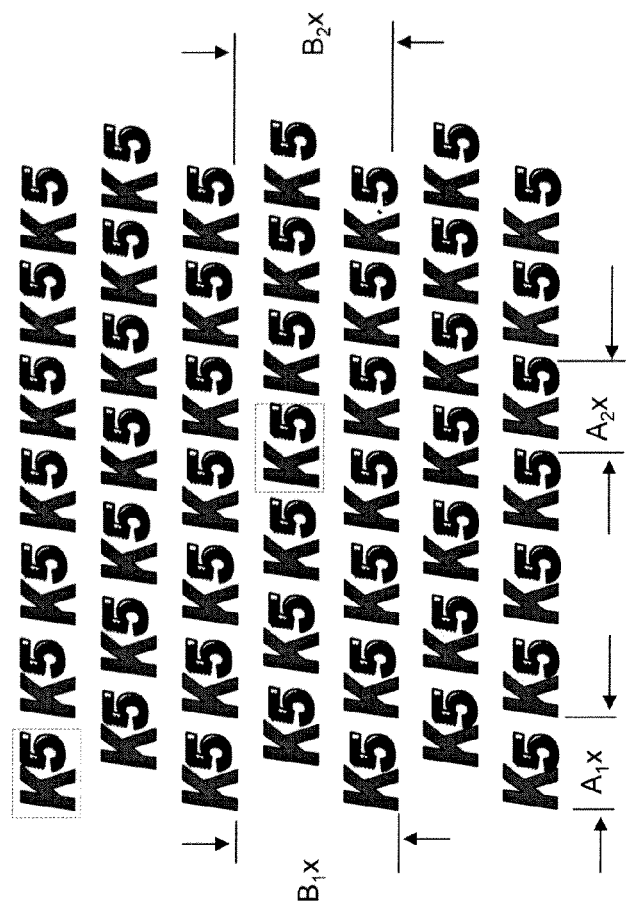

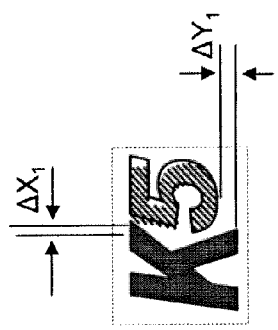
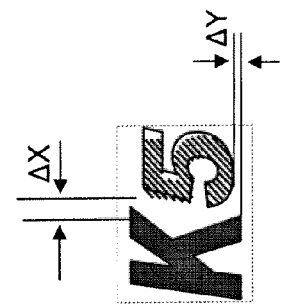
FIG. 11B

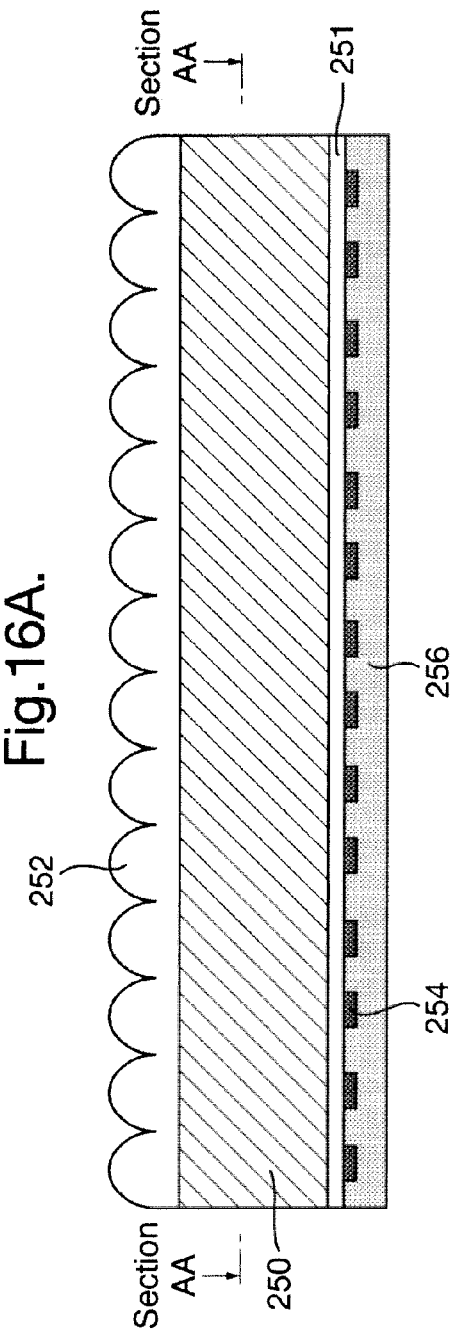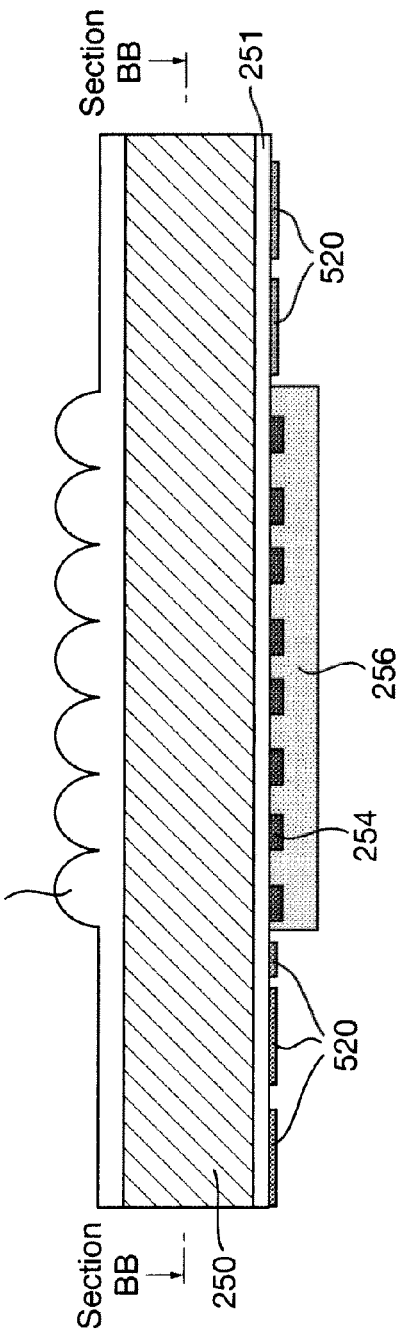

MOIRE MAGNIFICATION DEVICE

The invention relates to a moiré magnification device such as a security device, for example for use on security documents and other articles of value such as banknotes, cheques, passports, identity cards, certificates of authenticity, fiscal stamps and other documents for securing value or personal identity. It also relates to optical devices for use on packaging or the like.

Moiré magnification has been used as the basis of security devices for a number of years. A number of examples are described in WO-A-94/27254 and EP-A-1695121. In such a device, a regular array of micro-focusing elements defining a focal plane is provided over a corresponding array of image elements located in a plane substantially aligned with the focal plane of the focusing elements. The pitch or periodicity of the array of image elements is chosen to differ by a small factor from the pitch or periodicity of the focusing elements and this mismatch means that magnified versions of the image elements are generated.

The magnification factor depends upon the difference between the periodicities or pitches. A pitch mismatch between a microlens array and a microimage array can also conveniently be generated by rotating the microimage array relative to the microlens array or vice-versa, such that the microlens array and microimage array have a rotational misalignment. The rotational misalignment or the small pitch mismatch results in the eye observing a different part of the image in each neighbouring lens resulting in a magnified image. If the eye is then moved relative to the lens/image array a different part of the image is observed giving the impression that the image is in a different position. If the eye is moved in a smooth manner a series of images are observed giving rise to the impression that the image is moving relative to the surface. In the case where the pitch mismatch is generated by rotational misalignment the array of magnified images is rotated relative to the microimage array and consequently the parallax affect that results in the apparent movement of the magnified image is also rotated and this is known as skew parallax. The effect of pitch mismatch and rotational misalignment on the magnification and rotation of the magnified image observed in a moiré magnifier is described in "The Moiré Magnifier", M. Hutley, R Hunt, R F Stevens and P Savander, Pure Appl. Opt. 3 (1994) 133-142 published by IOP Publishing Limited.

The nature of the movement and orientation changes can be explained from the theory of moiré; this is discussed in detail in "The theory of the Moiré phenomenon" by I. Amidror published by Kluiver Academic Publishers in 2000, ISBN 0-7923-5949-6. The moiré effect of two periodic structures can be explained/predicted by considering the frequency vectors of the two structures. The orientation of the frequency vector represents the direction of the periodicity and the length represents the frequency (i.e. 1/Period). The vector is expressed by its Cartesian coordinates (u,v) where u and v are the horizontal and vertical components of the frequency.

The principles involved are discussed in more detail in WO-A-2005/106601.

Typically, the focusing elements comprise microlenses or micromirrors and the image elements are defined by simple icons or the like.

Hitherto no moiré magnifier devices have been demonstrated in the public domain which show two or more image icons of differing colour in predetermined mutual register. This is because of the immense technical difficulty in printing two separate microimage arrays which interlace or register in a predetermined way.

In accordance with the present invention, a moiré magnification device comprises a transparent substrate carrying:
i) a regular array of micro-focusing elements on a first surface, the focusing elements defining a focal plane;
ii) a corresponding array of microimage element unit cells located in a plane substantially coincident with the focal plane of the focusing elements, each unit cell comprising at least two microimage components;
wherein the pitches of the micro-focusing elements and the array of microimage element unit cells and their relative locations are such that the array of micro-focusing elements cooperates with the array of microimage element unit cells to generate magnified versions of the microimage components due to the moiré effect,
wherein first microimage components of the unit cells have a colour density different to the colour density of the other, second microimage components,
and wherein a further coloured layer is provided on or extending over the array of microimage element unit cells such that when the device is viewed, at least the second microimage components appear in a colour dependent at least partly on the further coloured layer and which is different from the colour of the first microimage components.

With this invention, rather than attempting to provide the two microimage components of the unit cell in different colours in a single printing operation or the like, we provide at least one and possibly both microimage components in such a way that they have a colour density (where "colour" includes black) which enables the further coloured layer to be viewed therethrough so that the resultant magnified microimage components appear as a result of combining the colours of the further coloured layer and the second microimage components and possibly the first (depending on whether or not it was opaque). By suitably choosing the difference in colour density of the first and second microimage components, the resultant colours are different. This gives the impression that the two microimage components were provided initially in different colours.

The first and second microimage components could define separate microimages and they may be spaced apart or adjacent or even abut one another. The two microimage components could also form parts of a larger symbol or other alphanumeric character, graphic design or the like as will be described below.

A convenient way of achieving a variation in colour density between the microimage components is to print one in the form of a screened pattern such as a halftone screen. Depending upon the printing method used, however, other methods for achieving the difference in colour density could be used such as the application of different ink thicknesses. Different ink thicknesses can be achieved for example in gravure printing utilising a cylinder with engraved cells of varying depth or by using conventional intaglio printing.

Typically, the first microimage components are formed by an opaque colour although this is not essential.

The further coloured layer typically presents a uniform colour although further difficult to reproduce effects can be achieved by providing the further coloured layer in a colour which varies laterally across the device. In this way, very complex magnified versions of the microimage components can be obtained.

So far, we have described devices in which the synthetic, magnified microimage components appear at the same depth. In some cases, however, the first microimage components define a first array with a first pitch and the second microimage components define a second array with a second, different pitch, each pitch being different from the pitch of the micro-forming elements whereby the magnified versions of the first and second components appear at different depths.

This provides additional security and a readily recognisable feature for an authenticator. However, in some cases, there can be a problem because the pitches of the two arrays differ and thus there is a risk that the microimage components of one array will overlap those of the other. To avoid this problem, preferably the lateral dimensions of the first and second arrays is such that the microimage components of the first array do not overlap the microimage components of the second array.

The microimage components may typically comprise icons such as symbols, geometric figures, alphanumeric characters and the like and most preferably provide information.

In preferred examples, the microimage components are printed on the substrate using any suitable printing process such as gravure, wet or dry lithographic printing, screen printing, intaglio printing and flexo printing. However, the microimage components could also be formed as grating structures, recesses or other relief patterns on the substrate. Anti-reflection structures may also be used as described in WO-A-2005/106601.

Micro-focusing elements, such as microlenses and concave mirrors, are preferably formed by embossing into the substrate surface, cast-curing or the like.

Moiré magnification devices generated by the current invention can be either 2-dimensional (2D) or 1-dimensional (1D) structures. 2D moiré magnification structures using spherical lenses are described in more detail in EP-A-1695121 and WO-A-94/27254. In a 2D moiré magnifier the microimages are magnified in all directions. In a 1D moiré magnification structure the spherical microlenses or micromirros are replaced with a repeating arrangement of cylindrical microlenses or micromirrors. The result of this is that the micro-image elements are subject to moiré magnification in one axis only which is the axis along which the mirrors exhibit their periodic variations in curvature or relief. Consequently the micro-images are strongly compressed or de-magnified along the magnification axis whilst the size or dimension of the micro image elements along the axis orthogonal to the magnification axis is substantially the same as they appear to the observer—i.e. no magnification or enlargement takes place.

The moiré magnification device generated by the current invention can form a security device by itself but could also be used in conjunction with other security features such as holograms, diffraction gratings and other optically variable effect generating structures.

The device can be used to authenticate a variety of substrates—with the nature of the substrate, in particular its thickness and flexibility having an influence on the corresponding properties of the optical device.

The invention has particular value in protecting flexible substrates such as paper and in particular banknote, where the device could define a patch, strip or thread. The thickness of the device will be influenced by how its employed within the banknote though to both avoid deformation of paper ream shape during the banknote printing process and further more the form and flexibility of the banknote itself, it is desirable that the thickness of the device does not exceed half of the thickness of the banknote itself (typically 85-120 um)—therefore it anticipated that in any embodiment the optical device will be less than 50 um including securing adhesives and preferably substantially so.

For example as a patch applied to a banknote the desired thickness will range from a few microns (excluding securing adhesive) to a maximum of 35-40 um (again excluding adhesive) for a label. Whilst for the case of a strip, the thickness will range again from a few micrometers for the case of a hot-stamped or transferred strip, up to 35-40 um for the case of a non transferred strip wherein the supporting carrier layer is retained (again excluding securing adhesives) as would be necessary should the strip be applied over a mechanical aperture in the banknote substrate.

In the case of a windowed thread preferred final thickness is in the range of 20-50 um.

Thicker versions of the security device (up to 300 μm) could be employed in applications which include passport paper pages, plastic passport covers, visas, identity cards, brand identification labels, anti-tamper labels—any visually authenticable items.

Furthermore, the device could be provided in a transparent window of a security document to enable it to be viewed in transmission.

Some examples of devices according to the invention will now described and contrasted with comparative examples with reference to the accompanying drawings, in which:

FIG. 3 illustrates schematically the location of the magnified images shown in FIG. 2;

FIG. 5 illustrates in cross-section, a schematic view of a transmissive base security device used for the FIG. 2 example;

FIG. 11A is a modified version of FIG. 9;

FIG. 11B illustrates different unit cells in FIG. 11A;

FIGS. 16A and 16B are sections on the lines A-A, B-B respectively in FIG. 15.

Figure 1:
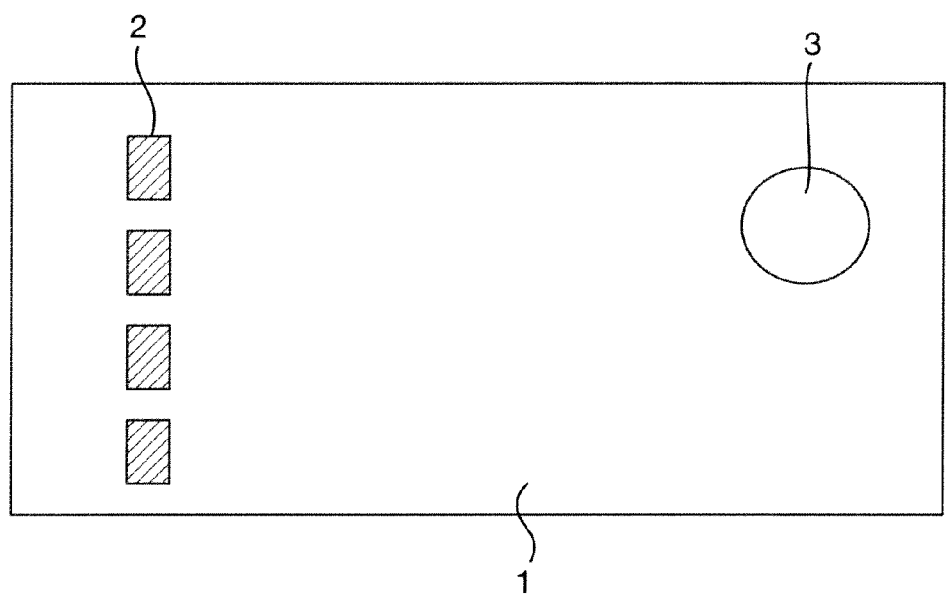
FIG. 1 is a schematic plan view of a banknote.

FIG. 1 illustrates schematically a banknote 1 having a security thread 2 exposed at windows and a further transparent window 3. The banknote 1 may be made of paper or polymer (such as bi-axially oriented polypropylene) and one or both of the security thread 2 and window 3 incorporates a security device according to the invention.

Before describing examples of the invention, we will provide some background with reference to FIGS. 2 to 5.

FIGS. 2-5 illustrate a comparative example of a security device. As can be seen in FIG. 2a, the appearance of the security device when viewed normally, i.e. perpendicularly, is a first array 10 of magnified image elements, in this case red coloured icons 10A in the form of a figure '5' against a background 11 formed by a magnified set of blue stars in pairs of large and small stars. The relative depths of the icons 10A and background 11 can be seen more clearly in FIG. 3 where the '5' icons 11 appear below the upper surface of the substrate 7 with the background plane 11 below the '5' icons 10A.

FIG. 4 illustrates the components of the security device in more detail. This shows that the background 11 is formed by an array of unit cells 11A (FIG. 4A) arranged side by side in an array as shown in FIG. 4B. The '5' icons 10A are formed as an array of unit cells as shown in FIGS. 4C and 4D. As shown in FIG. 4, the pitch of the unit cells 11A of the background array 11 in the X and Y directions is A2y, A2x. The pitch of the '5' icons 10A is A1x, A1y. Typically, A2x equals A2y and A1x equals A1y. However, there is a small difference between the pitches of the '5' icons 10A on the one hand and the unit cells of the background 10 on the other.

FIG. 5 illustrates in cross-section the overall structure of the device shown in FIGS. 2-4. Thus, the device comprises a transparent, PET or other polymer layer 20 (corresponding to substrate 7) on the upper surface of which is formed a two-dimensional array of spherical microlenses 22. The diameters of the microlenses 22 is typically in the range 1-100 microns, preferably 1-50 microns and even more preferably 10-30 microns, thus defining pitches in a similar range.

The focal length of the microlenses 22 (as measured from their planar back surface) is substantially equal to the thickness t of the optical spacer layer which in this example comprises the thickness of the substrate 20 plus the thickness of a print receptive layer 21 on the opposite surface of the substrate 20 to the microlens array 22 so as to define a focal plane 24 substantially co-incident with the surface of the print receptive layer. On the print receptive layer 21 is first printed the microimage array of '5' icons 10A in a red colour. Next, the background array 11 is printed in a blue colour. It will be seen in FIG. 5 that the two arrays are each printed on the print receptive layer 21 coincident with the focal plane 24 although the background print 11 also overlaps the '5' icon array 10 as shown at 25.

The present invention is not limited to any specific type or geometry of microlens, the only requirement being that the microlens can be used to form an image. Microlenses suitable for the present invention include those that refract light at a suitably curved surface of a homogenous material such as plano-convex lenslets, double convex lenslets, and fresnel lenses. Preferably the present invention will comprise spherical microlenses but lenses of any symmetry including cylindrical lenses could be employed. Both spherical and aspherical surfaces are applicable to the present invention. It is not essential for the microlenses to have a curved surface. Gradient refractive index (GRIN) lenses image light by a gradual refraction throughout the bulk of the material as a result of small variations in refractive index. Microlenses, based on diffraction, such as Fresnel zone plates can also be used. GRIN lenses and amplitude or mask based fresnel zone plates enable the surface containing the microlens array to be planar and offers advantage in print receptivity and durability.

It is preferable to use a periodic array of lenses generated by a replication process. Master microlens arrays can be produced by number of techniques such as photothermal techniques, melt and reflow of photoresist and photoresist sculpture. Such techniques are known to those skilled in the art and are detailed in chapter 5 of "Micro-Optics: Elements, Systems, and Applications" edited by Hans Peter Herzig, published by Taylor and Francis, reprinted 1998. The master microlens structure can then be physically copied by commercially available replication techniques such as hot embossing, moulding or casting. Materials into which the microlens structures can be replicated include but are not limited to thermoplastic polymers such as polycarbonate and polymethylmethacrylate (PMMA) for the hot embossing and moulding processes and acrylated epoxy materials curable by heat or radiation for the casting process. In a preferred process the microlens array is replicated via casting into a UV curable coating applied to a carrier polymer film such as PET.

For simplicity the following examples and embodiments will describe the use of spherical microlenses.

In order to create the phenomena of moiré magnification and enable the generation of moving images a pitch mismatch is introduced between the microimage array and the microlens array. One method is to have a microlens and microimage array with substantially the same pitch where the pitch mismatch is achieved by introducing a small rotational misalignment between the microimage and microlens array. The degree of rotational misalignment between the microimage and microlens array is preferably in the range 15°-0.05°, which results in a magnification range of between ~4×-1000× for the microimage array. More preferably the rotational misalignment is in the range 2°-0.1°, which results in a magnification range of between ~25×-500× for the microimage array.

Alternatively the microimage array and microlens array are in substantially perfect rotational alignment but with a small pitch mismatch. A small pitch mismatch would equate to a percentage increase/decrease of the pitch of the microimage array relative to the microlens array in the range 25%-0.1%, which results in a magnification range of between ~4×-1000× for the microimage array. More preferably the percentage increase/decrease of the pitch of the microimage array relative to the microlens array is in the range 4%-0.2%, which results in a magnification range of between ~25×-500× for the microimage array.

It is also possible to use a combination of a small pitch mismatch and a small rotational misalignment to create the phenomena of moiré magnification and enable the generation of moving images.

The result of the pitch mismatch between the arrays 10, 11 and the spherical lens array 22 causes moiré magnification of the microimages at different depths (as seen in FIG. 3).

The degree of magnification achieved is defined by the expressions derived in "The Moiré magnifier", M. Hutley, R Hunt, R Stevens & P Savander, Pure Appl. Opt. 3 (1994) pp. 133-142.

To summarise the pertinent parts of this expression, suppose the micro image pitch=A and the micro lens pitch=B, then magnification M is given by:

$$M = A/SQRT[(B\cos(\text{Theta}) - A)^2 - (B\sin(\text{Theta}))^2]$$

where, Theta equals angle of rotation between the 2 arrays.
For the case where A≠B and where Theta is very small such that $\cos(\text{Theta}) \approx 1$ & $\sin(\text{Theta}) \approx 0$ $$M = A/(B - A) = S/(1 - S)$$

Where $S = B/A$
However for large $M \gg 10$ then S must≈unity and thus $M \approx 1/(1-S)$ The depth of the synthetic image relative to the surface plane derives from the familiar lens equation relating magnification of an image located a distance v from the plane of lens of focal length f. This being $M = v/f - 1$ Or, since typically v/f >> 1

$M \approx v/f$

Thus the depth v of the synthetically magnified image = M*f.

Figure 2A:
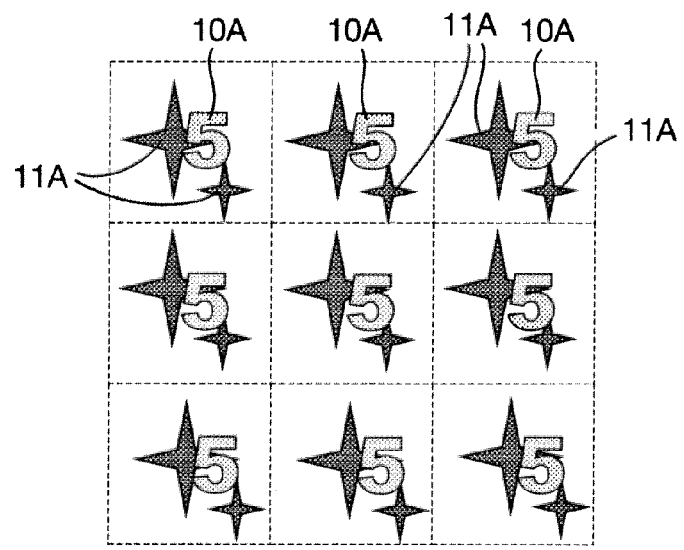
FIGS. 2a-2c illustrate the appearance of these versions of a first example of a security device in plan view.
Figure 2B:
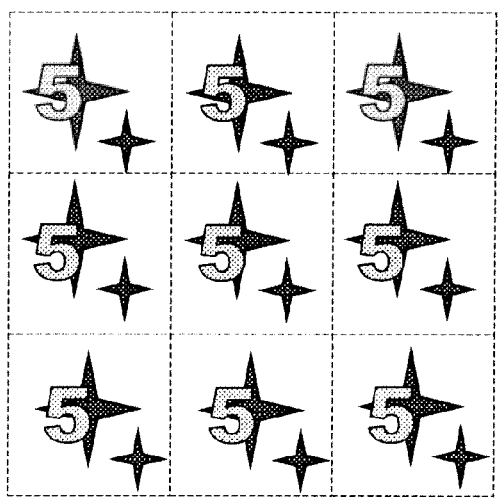
Figure 2C:
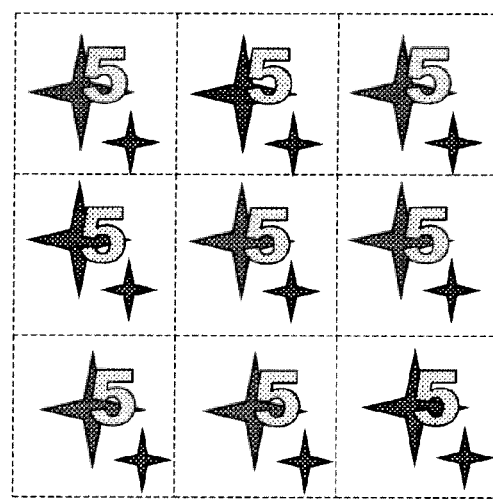
Figure 4C:
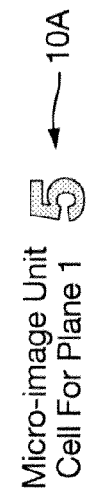
FIGS. 4C and 4D illustrate the foreground image of the image shown in FIGS. 2 and 3 as a unit cell and partial array respectively.
Figure 4D:
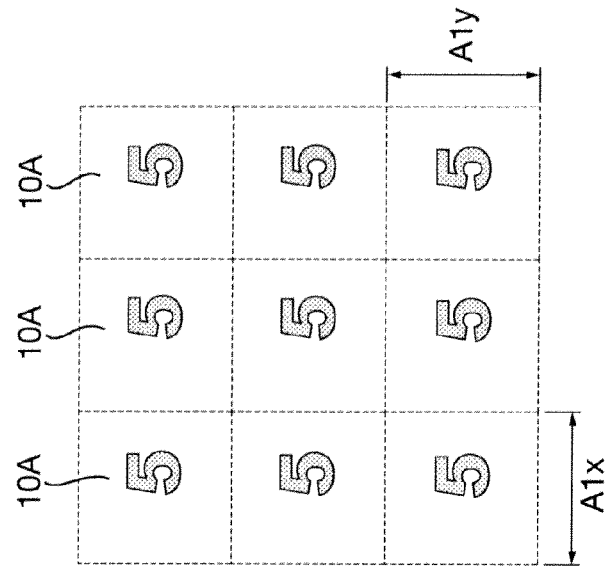
Figure 4A:
FIGS. 4A and 4B illustrate the background of the device shown in FIGS. 2 and 3 as a unit cell and partial array respectively.
Figure 4B:
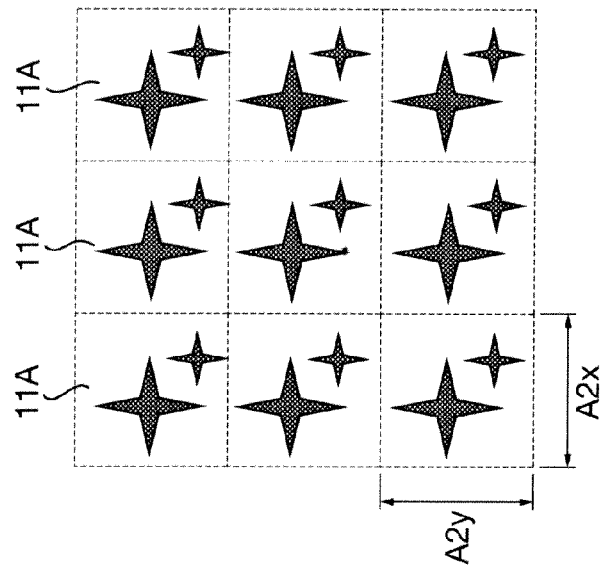

FIGS. 2a-2c show the second array 11 in different registration positions relative to the first array 10. The key point is that the design & choice of the first and second array elements or icons 10A, 11A is such that there is no significant change in information, content, symbolic relevance or aesthetic appearance when the position of one array is varied relative to the other—in other words the two arrays are not registration sensitive or have a strongly preferred register requirement. It should be noted that since the second array 11 is obscured or blocked by the first array 10 it is preferable that icon types which are especially information bearing, for example a denominational or alphanumeric symbol or such like are located in the first array 10 which is visualised as being in front of the second array 11. Furthermore, in the example shown in FIG. 2, each unit cell 11A of the second array 11 is comprised of two identical icons i.e. a large and small star—as a consequence, in informational terms there is a redundancy of information in each unit cell. This redundancy property means that if at some relative registration between the two arrays the icon pattern from the first array (the 5's) substantially obscures the array of larger stars, then the smaller star icon array can be readily visualised without significant obscurement or interference from the first array. Consequently the observer unambiguously sees two synthetically magnified icon arrays comprising a first pattern of red 5's at a given depth behind or in front of the surface plane of the deviation and located behind that pattern at a different image depth a second pattern of blue stars (50% large and 50% small). From the perspective of public recognition the visual effect or appearance will not differ significantly with the position of the first pattern relative to the second pattern.

In summary for the image design shown in FIG. 2, the describable optically variable is insensitive (i.e. substantially invariant) to uncontrolled manufacturing variations in the register of the first icon array 10 to the second array 11. This is an important aspect of this invention.

It should be recognised that the use of contrasting colours for the first and second image arrays 10, 11 assists the viewer to discriminate between the two arrays particularly in the regions where the individual elements overlap and thus assisting in the public recognition and verification of such a device. To help understand the benefits of colour differentiation we show in FIG. 2d, the same two image arrays as before but this time both the first and second arrays are provided/printed in a single colour (with three different relative positions for the arrays being shown as in FIG. 2a). As can be seen where the image elements from the first and second pattern overlap it is difficult to distinguish the outline of the upper first array element from the underlying second array element, which can serve to confuse the observer or viewer thus reducing the effectiveness of having multiple image planes.

EXAMPLES

Suppose the structure of FIGS. 2 & 5 was comprised of micro lenses 22 with a focal length f of 40 μm or 0.04 mm. Furthermore let us suppose both the micro lenses and the supporting substrate 20 where both comprised of materials with refractive index n of 1.5. Then it follows that the base diameter D of the lenses will constrained by the expression $D \leq f*2(n-1)$ and therefore $D \leq 0.04*2(1.5-1)$ giving $D \leq 0.04$ mm.

We might then choose a value for D of 0.035 mm and a lens pitch B of 0.04 mm (along each axis), resulting in a lens array with a f/# number close to unity with reasonable close packing (inter lens gap 5 um).

In a first example suppose we required the first image array 10 to be located 2 mm behind surface plane of the substrate and the second image array 11 to be located 6 mm behind the surface plane (note images behind the surface plane are by definition virtual and a more detailed analysis shows them to be non-inverted relative to micro image object array).

For further illustrative simplicity we assume that A1y=A1x and A2y=A2x.

Given M=v/f, then it follows if f=0.04 mm and v=2 mm, then M1=2/0.04=50.

Therefore since M1=A/(B-A)=50, it follows 50 (B-A1)=A1, giving A1=B (50/51)

Substituting B=0.04 mm we obtain A1=0.0392 mm.

Similarly M2=6/0.04=150 and thus 150 (B-A2)=A2, giving A2=B (150/151)=0.0397 mm.

In a second example suppose we required the first image array 11 to be located 2 mm in front of the surface plane, whilst the second image array 11 remains located 6 mm behind the surface plane.

In contrast to the previous example here the first image array 10 will form a real inverted image and thus the sign of the magnification will be negative (which follows from assigning a negative value for the image distance v in the previous expression for magnification).

Hence M1=-2/0.04=-50 and thus -50(B-A1)=A1, giving A1=50/49 B=0.0408 mm.

Hence we see that for the first image array to be located in front of the surface plane (i.e appearing to float) its micro image array must have a pitch larger than the lens pitch. Conversely if the image pitch is less than the lens pitch then the image array will appear to be located below the surface plane.

In the above description, the microfocussing elements comprise lenses. However, these could be replaced by concave reflectors as is known in the art.

Figure 6:
FIG. 6 illustrates a first example of a unit cell according to the invention.
Figure 7:
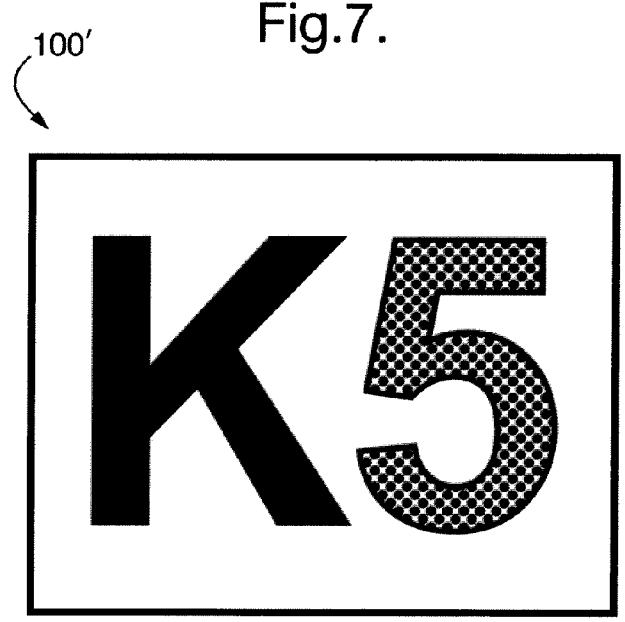
FIG. 7 illustrates a second example of a unit cell according to the invention.
Figure 8:
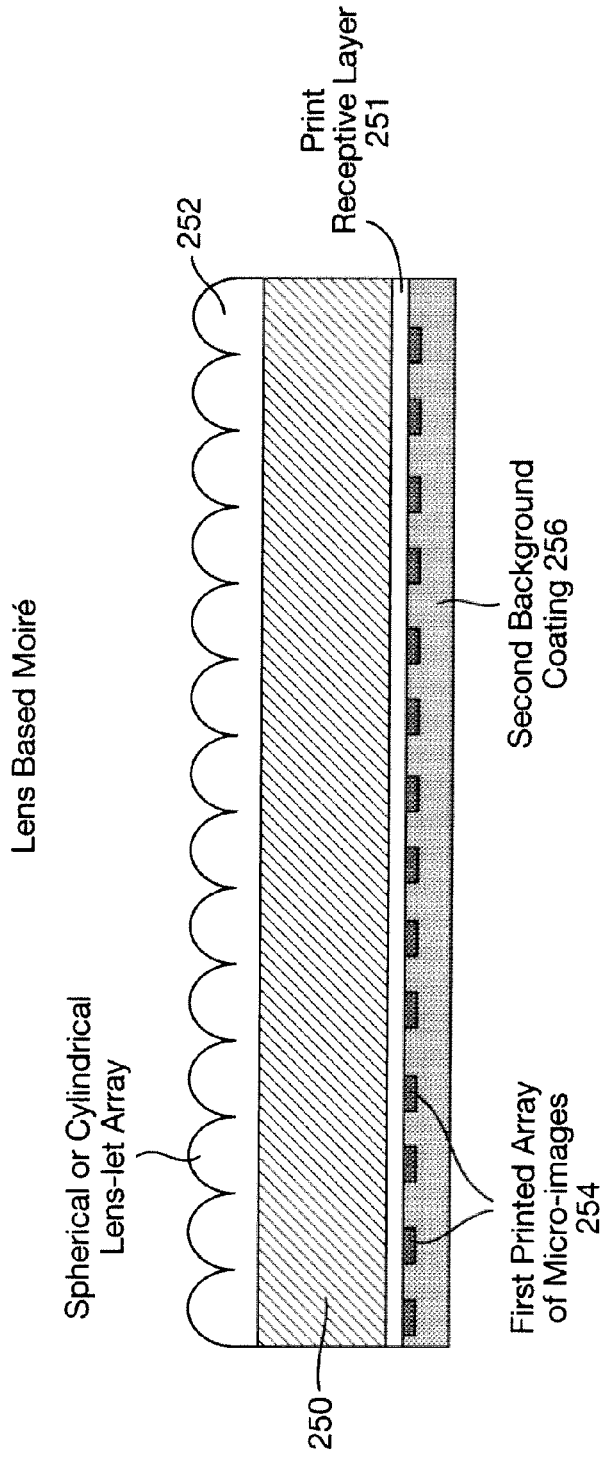
FIG. 8 is a schematic cross-section through a device according to the invention.

With that background, which is applicable to the present invention, we now describe some examples of the invention. FIG. 6 shows a microimage unit cell 100 consisting in the example of a solid inked or opaque K followed by a screened (and thus semi-translucent) 5—this screening may take the form of a linear screen as shown in FIG. 6 or a halftone screen as shown in the unit cell 100' of FIG. 7 or any variation in between. A cross-sectional view of this device is shown in FIG. 8. Illustrating a transparent plastic substrate 250 on one surface of which is provided a microlens array 252 and on the other surface a print receptive layer 251 is provided on which is provided the microimage array (layer 1) 254. The print receptive layer 251 can also function as a focal adjustment layer.

Figure 9:
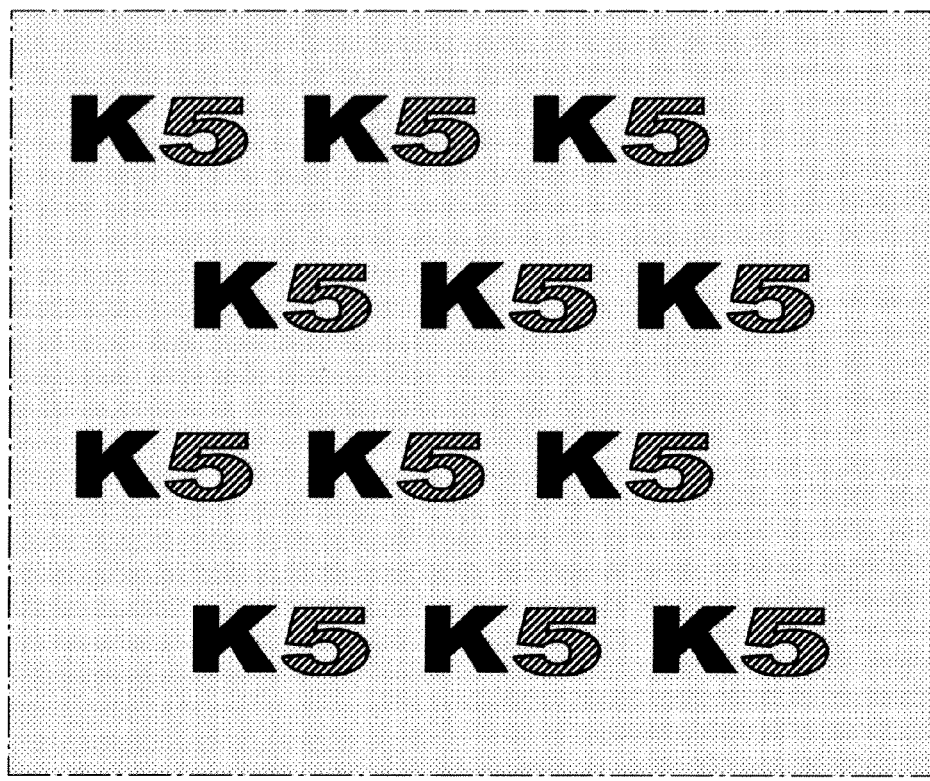
FIG. 9 illustrates the appearance of the device when viewed.

Following the application of the first printed array 254 the same side of the device is then over coated with a second colour 256 with the effect that the magnified synthetic image of the 5 has a colour which is the superposition of the first and second colours. For example suppose the first colour used to print the K5 unit cells 100 was blue and then the second colour applied as a uniform coating 256 was yellow then it follows that in the synthetically magnified image array the K's will appear in blue (since the K was printed with a substantially opaque colour) and the 5's will appear in a shade of green, the hue of which will depend on the relative weighting of blue and yellow present in the 5's—as shown in FIG. 9.

To ensure good contrast between the visualised icons and the background it is desirable that the background colour 256 contrasts both in hue and brightness relative to the colour of the unit cells 254. Ink or colorant thickness for the printed micro images is envisaged to fall in range 0.2-3 µm but especially 0.5-1.0 µm.

Ink or colorant thickness for the background colour will vary according to opacity requirements but is envisaged to fall within the range 0.5-5 µm and especially 1-3 µm.

We have provided one design example but of course the general principle of having two image icons appearing in two different colours, hues or brightness's but remaining in good relative register can be applied to a variety of icon types and associations—for example the symbol for a national currency and the relevant denomination (e.g. £,$ etc and denomination).

In this example, the second colour is applied as a uniform coating 256. However, it would also be possible to use a variety of other types of coloured coating, for example in which the colour varies in a lateral manner across the device.

Figure 10A:
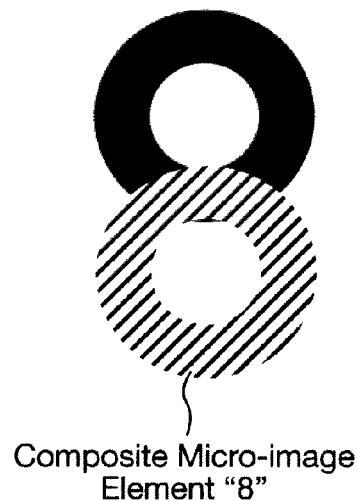
FIGS. 10A and 10B illustrate another example of a unit cell and the resultant magnified image.
Figure 10B:
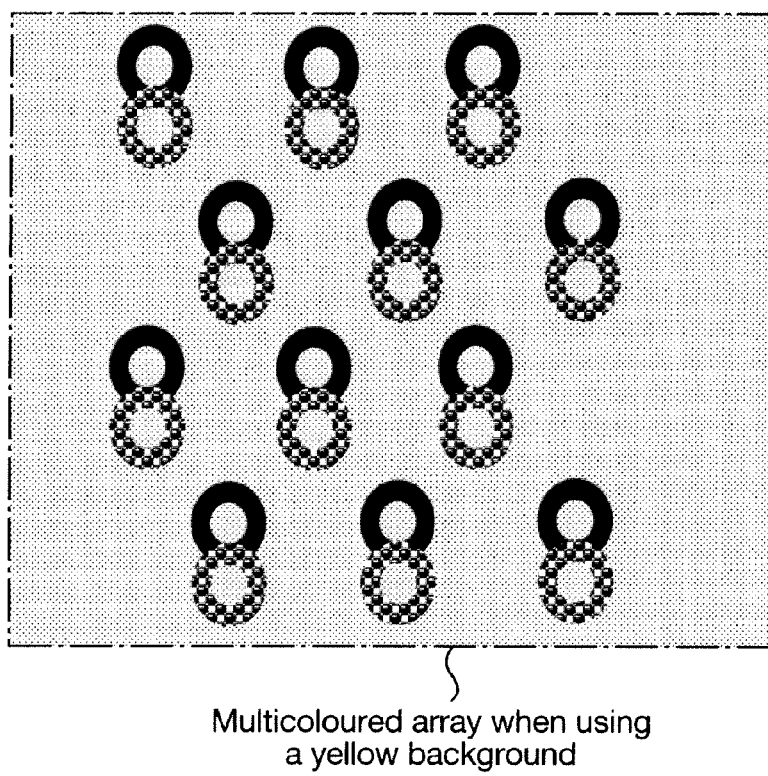

In the examples described so far, the unit cell 100 comprises two separate microimage components: K and 5. It would also be possible to utilise microimage components that abut one another and form portions of a more complex image. An example is shown in FIG. 10 where the unit cell in FIG. 10A is made up of two microimage components, a solid circle 300 having a partial cut-out within which part of a screened circle 302 is printed. When the device is viewed (FIG. 10B) an array of "8s" will be seen with the colour of the FIG. 8 varying in a vertical dimension.

In a further modification to that shown in the examples shown in FIGS. 6-10 above the K and the 5 (coupled symbols or icons) where visible are not only in different colours but in different planes of depth. The problem associated with the latter is that it requires the K and 5 micro image arrays or lattices to have differing pitches and this will cause the two arrays to de-synchronise as shown schematically in FIG. 11. Considering the left hand array of images in FIG. 11 we see that at the centre of the array indicated by a circle, the K and 5 are in the desired register, however as the 5 array has a smaller pitch than the K array we see that they gradually move out of register and eventually if the dimensions of the array were extended the micro images would overlap and interfere which would have a deleterious effect on the visualised image. To remedy this it is necessary to create an image break 260 wherein phasing of two micro image arrays is reset such that the two arrays never reach the point where the microimages would overlap. This break can conveniently be formed so as to define a cutting region when forming a security thread or the like.

Suppose we wish to create a device where the synthetic image array is as per FIG. 9 but where the magnified K and the 5 elements have different image planes and where the 5 elements are for example 6mm behind surface plane and the the K's are 4 mm behind surface plane.

Then the corresponding microimage array will look like the schematic shown in FIG. 11A. At the centre of the array the K and 5 have the desired mutual register—however the K array by virtue of its lesser depth and thus magnification will have a smaller pitch in both axes causing the two arrays to move out slightly out of register until at the corner location (shown top left) the two symbols are virtually touching—which we consider to be limits of acceptability.

Figure 11:
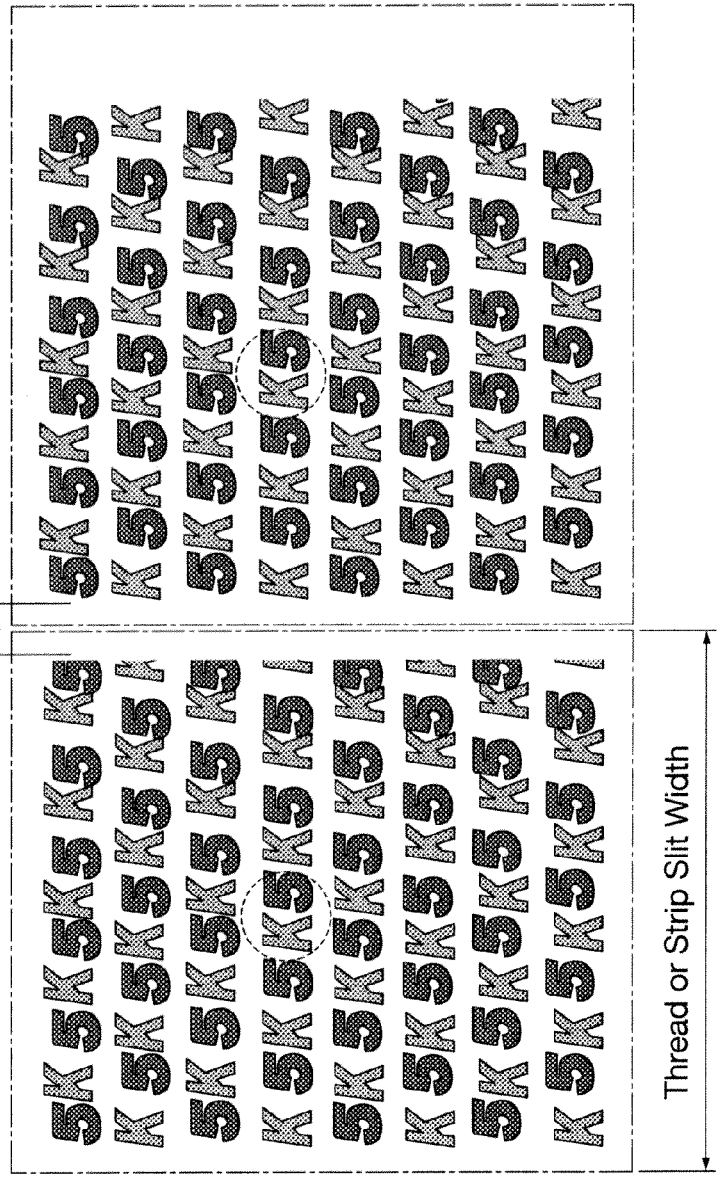
FIG. 11 illustrates a further example of a device according to the invention.

FIG. 11 A shows the center element and the top corner elements and the shift in register is characterised by the difference $\Delta X - \Delta X_1$ and the difference $\Delta Y - \Delta Y_1$ (FIG. 11B). We may calculate the size of the array for which the shift reaches limiting value as follows:

Maximum tolerated shift from center view=$\Delta X - \Delta X_1$

This occurs over a number of micro image repeats nx given by $$n_x = (\Delta X - \Delta X_1)/(A_1 X - A_2 X)$$

Thus the span Wx of the array along X-direction where mutual position of first and second array are in register is given by $$Wx = 2\ n_x{}^*(A_1 X + A_2 X)/2 = (\Delta X_1 - \Delta X)^*(A_1 X + A_2 X)/(A_1 X - A_2 X)$$

Similarly the span height Hy of the array along Y axis where mutual position of first and second array are in register is given by $$Ny = (\Delta Y - \Delta Y_1)/(A_1 y - A_2 y) \text{ and thus } Hy = (\Delta Y_1 - \Delta X)^*(A_1 Y + A_2 Y)/(A_1 Y - A_2 Y)$$

Figure 14:
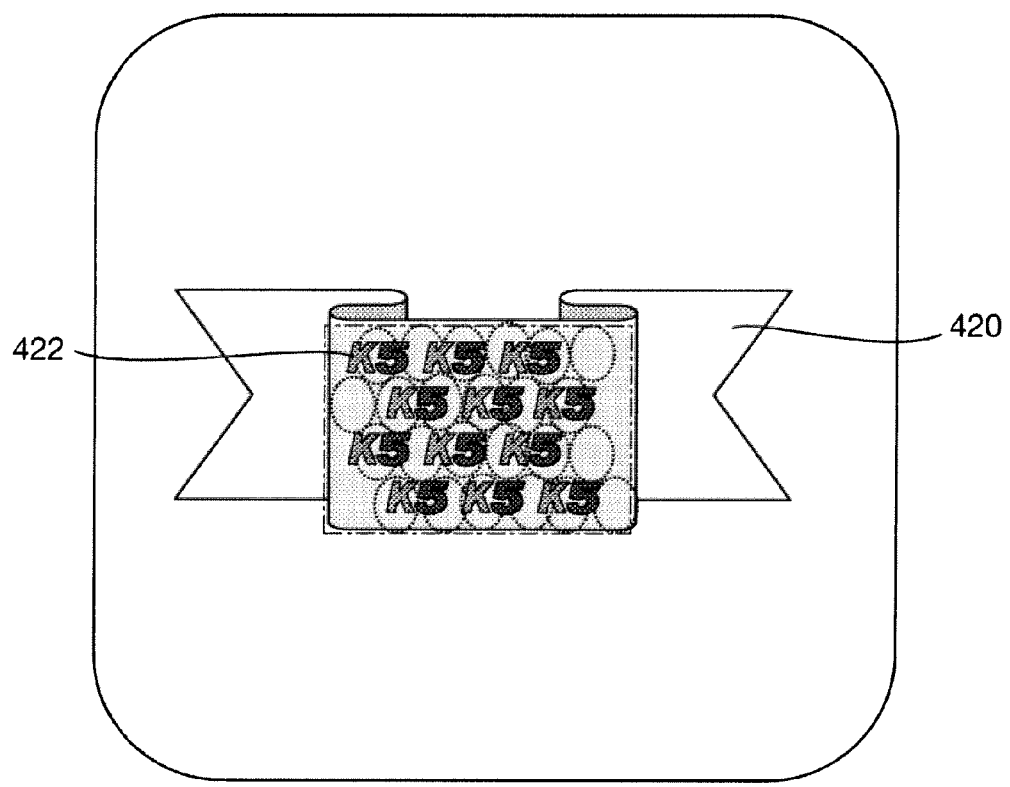
FIG. 14 is another example of a label in which a moiré magnification device is incorporated into a holographic image generating structure.

As an alternative, the security device could be fabricated as a mirror-based moiré device as shown in FIG. 14. In this case, the spherical microlens array is replaced by a spherical or aspheric concave mirror array 300 formed on one surface of the transparent polymer substrate 310. The other surface is provided with the same array of microimage cells as described with reference to FIG. 8. Following the application of this printed array 254 the same side of the device is then overcoated with a second colour 256 with the effect that the magnified synthetic image of the 5 has a colour which is a superposition of the first and second colours.

This structure is intended for viewing only in reflection mode and thus is most relevant for application onto opaque substrates (strip & patch) or partially embedding into opaque substrates (windowed thread). As per the lens system the printed micro images must be coincident with the focal plane of the mirrors to a precision determined by the depth of focus or field of the mirror system.

Since the incident light has to pass through or be transmitted by the layer of the second colour and the microimage cells of the first colour before being reflected back as collimated light by the mirror array, then it follows that at least the second colour layer and at least one of the components of the microimage element (in this case the 5) must be at least partially translucent to enable them to appear in the intended colour. If, as in this example, one of the microimage components is opaque then this component will appear black in the final device, The metal coating on the mirrors will also effect the background colour and the colour of the transluscent microimage component or components. The metal coating can be a 'white' reflector such as Aluminium or other coloured metals such as Copper or it alloys maybe be used. Other metals such as Silver, Gold, Platinum, Chrome, Nickel, Nickel-Chrome, Palladium, Tin etc may also be used.

It should be noted that the focal length of a concave mirror is equal to half its radius of curvature R and therefore can have a limiting minimum value approaching one quarter of the mirror base diameter. In simple terms, for a given base diameter the focal length and F number of a mirror can be one quarter of the value of equivalent lens (assuming typical refractive index of 1.5). However as reducing F number equates to reducing depth of focus, then in practice it will often be desirable to have a mirror base diameter much less than 2 R.

For example considering the preferred device thicknesses cited earlier we may require the mirror focal length to be 40 um—then this requires the mirror radius R to have a value 80 um and thus a maximum theoretical base diameter approaching 160 um and thus an F number f/#=0.25 mm.

In the examples described above, the microimage elements have been provided by printing onto the substrate. It would also be possible to provide some or all of the image elements as relief structures and examples of some of these are shown in FIGS. 12A-12J. In these Figures, 'IM' indicates the parts of the relief generating an image while 'NI' indicates those parts which do not generate an image.

Figure 12:
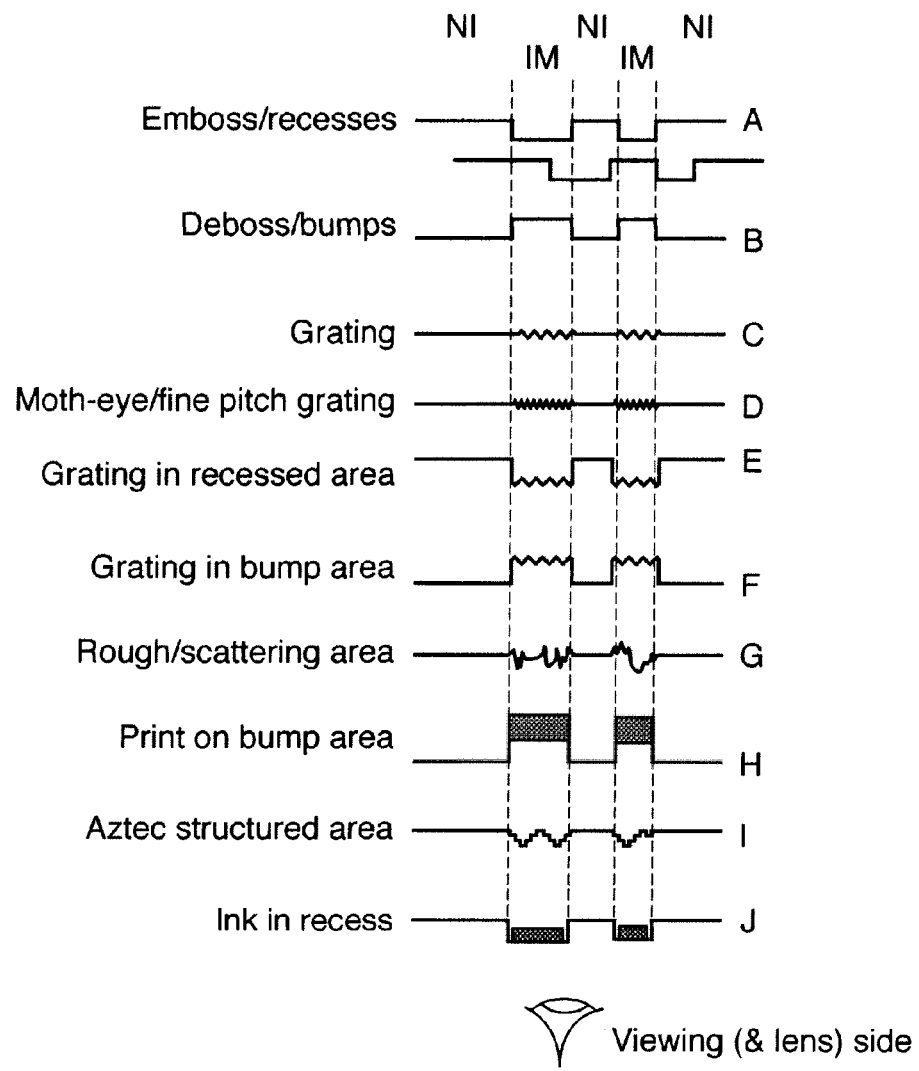
FIG. 12A-12J illustrate different methods for forming the microimage components.

FIG. 12A illustrates embossed or recessed image elements. FIG. 12B illustrates debossed image elements. FIG. 12C illustrates image elements in the form of grating structures while FIG. 12D illustrates moth-eye or other fine pitch grating structures.

These structures can be combined. For example, FIG. 12E illustrates image elements formed by gratings in recesses areas while FIG. 12F illustrates gratings on debossed areas.

FIG. 12G illustrates the use of a rough embossing.

FIG. 12H illustrates the provision of print on an embossed area while

FIG. 12I illustrates "Aztec" shaped structures.

FIG. 12J illustrates ink filled recesses.

The various embodiments of the device construction described above can be slit or cut into patches, foils, stripes, strips or threads for incorporation into plastic or paper substrates in accordance with known methods.

In one embodiment the current invention could be incorporated into a security paper as a windowed thread.

Figure 13:
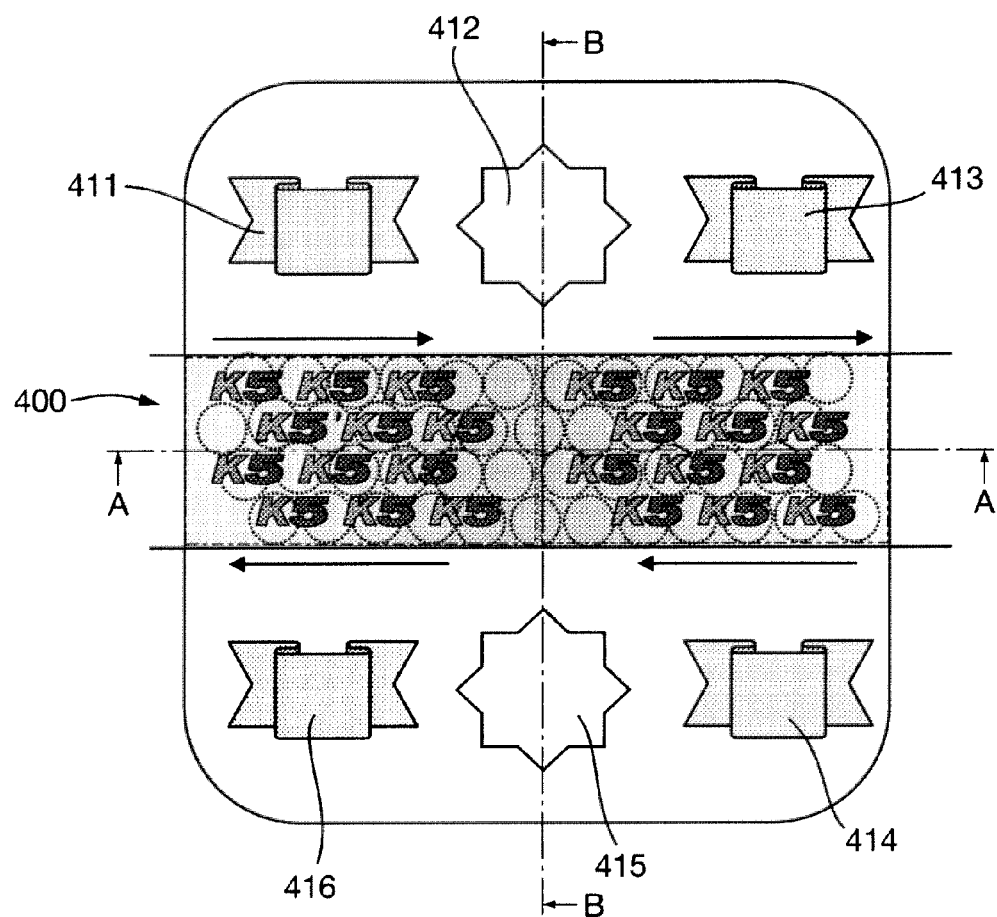
FIG. 13 is a plan view of a security label provided with a moiré magnification device according to an embodiment of the invention and a number of holographic image generating structures.

In further examples, the security device also includes one or more other optical security features. An example of this is shown in FIG. 13. In this example, a moiré magnifier device 400 is formed as described with reference to FIGS. 6-10. The security device also includes a number of holographic image generating structures 411-416. The holographic image structures can be cast or embossed into the same resin as the microlenses but equally two different resins, one suitable for casting the microlenses and one suitable for embossing a holographic structure could be applied in register. Alternatively the holographic structures could be embossed into a polymeric lacquer positioned on the opposite side of the polymeric layer to the microlenses.

The holographic generating structures can be in the form of holograms or DOVID image elements. In the label construction shown in FIG. 13, the microlenses and the magnified image array is located in a central horizontal band or region of the label whilst the holographic generating structures are located on either side. However, it should be understood that this example is purely illustrative and for example the holographic generating structures could be located in a central band or strip with the moiré magnifier being provided in one or more regions on either side. Alternatively moiré magnified images and the image provided by the holographic generating structures could be integrated into a single image by each providing components of a single image.

FIG. 14 illustrates an example of such an integrated design where the holographic generating structures 420 form a scroll and in the middle of the scroll the holographic structures are replaced with a moiré magnifier 422 to create a moiré magnified image in this case of moving "5"'s and stars.

In the case of the holographic structures, these can have any conventional form and can be fully or partially metallised. Alternatively the reflection enhancing metallised layer can be replaced with a substantially transparent inorganic high refractive index layer, such as ZnS.

Whatever arrangement is defined, it is advantageous if the individual regions allocated to the two different optical effects in FIGS. 13 and 14 are sufficiently large to facilitate clear visualisation of the effects.

The security devices shown in the previous figures are suitable to be applied as labels to secure documents which will typically require the application of a heat or pressure sensitive adhesive to the outer surface of the device which will contact the secure document. In addition an optional protective coating/varnish could be applied to the exposed outer surface of the device. The function of the protective coating/varnish is to increase the durability of the device during transfer onto the security substrate and in circulation.

In the case of a transfer element rather than a label the security device is preferably prefabricated on a carrier substrate and transferred to the substrate in a subsequent working step. The security device can be applied to the document using an adhesive layer. The adhesive layer is applied either to the security device or the surface of the secure document to which the device is to be applied. After transfer the carrier strip can be removed leaving the security device as the exposed layer or alternatively the carrier layer can remain as part of the structure acting as an outer protective layer. A suitable method for transferring security devices based on cast cure devices comprising micro-optical structures is described in EP1897700.

The security device of the current invention can also be incorporated as a security strip or thread. Security threads are now present in many of the world's currencies as well as vouchers, passports, travellers' cheques and other documents. In many cases the thread is provided in a partially embedded or windowed fashion where the thread appears to weave in and out of the paper. One method for producing paper with so-called windowed threads can be found in EP0059056. EP0860298 and WO03095188 describe different approaches for the embedding of wider partially exposed threads into a paper substrate. Wide threads, typically with a width of 2-6 mm, are particularly useful as the additional exposed area allows for better use of optically variable devices such as the current invention.

The security device of the current invention can be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

Additional optically variable materials can be included in the security device such as thin film interference elements, liquid crystal material and photonic crystal materials. Such materials may be in the form of filmic layers or as pigmented materials suitable for application by printing.

The security device of the current invention may comprise an opaque layer.

Figure 15:
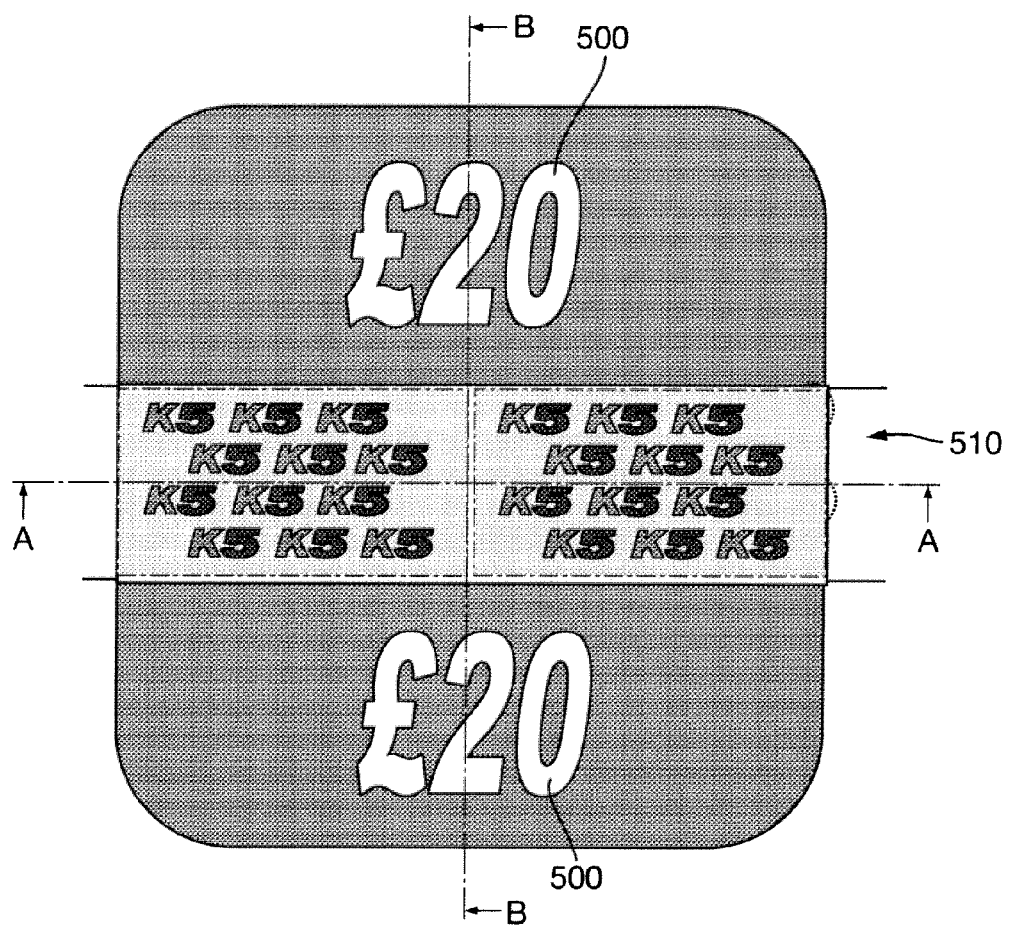
FIG. 15 illustrates an embodiment of a moiré magnification device according to the invention in combination with demetallised images.

FIGS. 15 and 16 show a further security feature in the form of a demetallised image 500 incorporated within a security device of the current invention. The moiré magnified image array 510 of the device are observed In the central band of the device. As can be seen in FIG. 16, the structure of the feature shown in FIG. 15 along section A-A is as shown in FIG. 8. In the regions outside of the central band exhibiting moiré magnification (as seen along section B-B) the print receptive layer has been metallised 520. Parts of the metal layer are demetallised to define the demetallised images thus enabling the creation of demetallised indicia which can be viewed in reflective but more preferably transmitted light.

Figure 17:
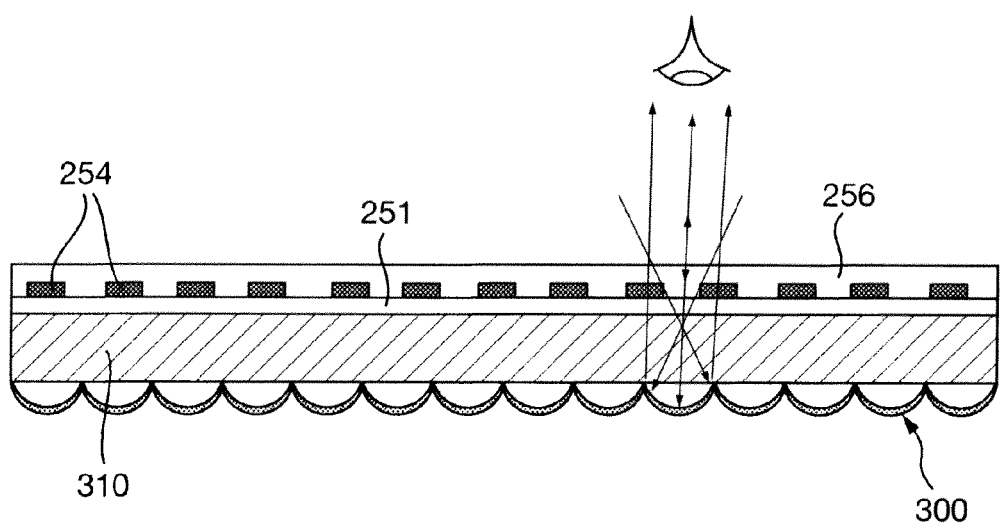
FIG. 17 is a cross-section similar to FIG. 8 but of a mirror based embodiment.

In a further example and in reference to the mirror-based moiré example shown in FIG. 17 the metallised layer forming the micromirrors may be extended beyond the micormirrors and then parts of this layer can be demetallised to define demetallised images.

One way to produce partially metallised/demetallised films in which no metal is present in controlled and clearly defined areas, is to selectively demetallise regions using a resist and etch technique such as is described in U.S. Pat. No. B-4,652, 015. Other techniques for achieving similar effects are for example aluminium can be vacuum deposited through a mask, or aluminium can be selectively removed from a composite strip of a plastic carrier and aluminium using an excimer laser. The metallic regions may be alternatively provided by printing a metal effect ink having a metallic appearance such as Metalstar® inks sold by Eckart.

In an alternative machine-readable embodiment a transparent magnetic layer can be incorporated at any position within the device structure. Suitable transparent magnetic layers containing a distribution of particles of a magnetic material of a size and distributed in a concentration at which the magnetic layer remains transparent are described in WO03091953 and WO03091952.

In a further example the security device of the current invention may be incorporated in a security document such that the device is incorporated in a transparent region of the document. The security document may have a substrate formed from any conventional material including paper and polymer. Techniques are known in the art for forming transparent regions in each of these types of substrate. For example, WO8300659 describes a polymer banknote formed from a transparent substrate comprising an opacifying coating on both sides of the substrate. The opacifying coating is omitted in localised regions on both sides of the substrate to form a transparent region.

EP1141480 describes a method of making a transparent region in a paper substrate. Other methods for forming transparent regions in paper substrates are described in EP0723501, EP0724519, EP1398174 and WO03054297.

One or more of the microimage arrays of the present invention may be printed with inks comprising materials that respond visibly to invisible radiation. Luminescent materials are known to those skilled in the art to include materials having fluorescent or phosphorescent properties. It is also well known to use other materials that respond visibly to invisible radiation such as photochromic materials and thermochromic materials. For example only one of the magnified arrays might be visible in normal daylight conditions with the second magnified image becoming visible only under UV illumination. Alternatively the two magnified arrays could appear the same colour in normal daylight conditions and different colours when viewed using a filter or when viewed under UV illumination.

The invention claimed is:

1. A moiré magnification device comprising a transparent substrate carrying:
   i) a regular array of micro-focusing elements on a first surface, the focusing elements defining a focal plane;
   ii) a corresponding array of microimage element unit cells located in a plane substantially coincident with the focal plane of the focusing elements, each unit cell comprising at least two microimage components;
   wherein the pitches of the micro-focusing elements and the array of microimage element unit cells and their relative locations are such that the array of micro-focusing elements cooperates with the array of microimage element unit cells to generate magnified versions of the microimage components due to the moiré effect,
   wherein in at least one of the unit cells comprising at least two microimage components, a first microimage component of the unit cell has a color density different than the color density of the other, second microimage component,
   and wherein a further colored layer is provided on or extending over the array of microimage element unit cells such that when the device is viewed, at least the second microimage components appear in a color dependent at least partly on the further colored layer and which is different from the color of the first microimage components.

2. The device according to claim 1, wherein the first and second microimage components are adjacent one another.

3. The device according to claim 2, wherein the first and second microimage components abut one another.

4. The device according to claim 1, wherein the second microimage components are formed as a screened pattern.

5. The device according to claim 4, wherein the screened pattern is in the form of a half-tone screen.

6. The device according to claim 1, wherein the first microimage components are formed by an opaque color.

7. The device according to claim 1, wherein the further colored layer presents a uniform color.

8. The device according to claim 1, wherein the color of the further colored layer varies in a lateral direction.

9. The device according to claim 1, wherein the first microimage components define a first array with a first pitch and the second microimage components define a second array with a second, different pitch, each pitch being different from the pitch of the microfocusing elements whereby the magnified versions of the first and second components appear at different depths.

10. The device according to claim 9, wherein the lateral dimensions of the first and second arrays is such that the microimage components of the first array do not overlap the microimage components of the second array.

11. The device according to claim 1, wherein the microfocusing elements comprise microlenses.

12. The device according to claim 11, wherein each microlens has a diameter in the range 1-100 microns.

13. The device according to claim 11, wherein the microlenses are selected from the group consisting of spherical lenses, cylindrical lenslets, plano-convex lenslets, double convex lenslets, fresnel lenslets and fresnel zone plates.

14. The device according to claim 1, wherein the microfocusing elements comprise concave mirrors.

15. The device according to claim 1, wherein the microimage components comprise.

16. The device according to claim 15, wherein the icons are selected from the group consisting of symbols, geometric figures, alphanumeric characters, logos and pictorial representations.

17. The device according to claim 1, wherein the microimage components are printed on the substrate.

18. The device according to claim 1, wherein the microimage components are formed as grating structures, recesses or other relief patterns on the substrate.

19. The device according to claim 1, wherein the substrate comprises a polymer.

20. The device according to claim 19, the distance between the array of microfocusing elements and the array of microimage element unit cells is in the range 1-50 microns.

21. The device according to claim 19, wherein the polymer is selected from the group consisting of polyethylene teraphthalate (PET), polyamide, polycarbonate, polyvinylchloride (PVC), polyvinylidenechloride (PVdC), polymethylmethacrylate (PMMA), polyethylene naphthalate (PEN), and polypropylene.

22. A security device according to claim 1.

23. The security device according to claim 22, further comprising one or more optically variable effect generating structures located adjacent or integrated with the moiré magnification device.

24. The security device according to claim 22, formed as a security thread, label or patch.

25. The security device according to claim 22, the device being provided in a transparent window of a security document.

26. The security device according to claim 25, wherein the security document is a banknote or an identification card.

27. An article provided with an optical device according to claim 1.

28. The article according to claim 27, wherein the article comprises one of a banknote, a cheque, a passport, identity card, certificate of authenticity, fiscal stamp and other document of security value or personal identity.

\* \* \* \* \*